(12) United States Patent
Koehler et al.

(10) Patent No.: US 11,230,120 B2
(45) Date of Patent: Jan. 25, 2022

(54) POWER ALLOCATION IN PRINTING DEVICES

(71) Applicant: Hewlett-Packard Development Company, L.P., Spring, TX (US)

(72) Inventors: Duane A Koehler, Vancouver, WA (US); Robert Yraceburu, Vancouver, WA (US); Daniel James Magnusson, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/733,800

(22) PCT Filed: Aug. 31, 2018

(86) PCT No.: PCT/US2018/048988
§ 371 (c)(1),
(2) Date: Oct. 28, 2020

(87) PCT Pub. No.: WO2020/046354
PCT Pub. Date: Mar. 5, 2020

(65) Prior Publication Data
US 2021/0221151 A1    Jul. 22, 2021

(51) Int. Cl.
*B41J 11/00*    (2006.01)

(52) U.S. Cl.
CPC .............. *B41J 11/00242* (2021.01)

(58) Field of Classification Search
CPC .................................................. B41J 11/00242
See application file for complete search history.

(56) References Cited

U.S. PATENT DOCUMENTS

| | | | |
|---|---|---|---|
| 5,214,442 A | 5/1993 | Roller | |
| 2006/0197805 A1* | 9/2006 | Smith | B41J 2/0457 347/56 |
| 2012/0013663 A1* | 1/2012 | Snyder | B41J 2/17593 347/14 |
| 2012/0287196 A1 | 11/2012 | Boland | |
| 2014/0198164 A1 | 7/2014 | Thayer | |
| 2016/0321017 A1 | 11/2016 | Konica | |
| 2017/0334216 A1 | 11/2017 | Pappenberger | |

FOREIGN PATENT DOCUMENTS

JP    2017213795    12/2017

\* cited by examiner

*Primary Examiner* — Bradley W Thies
(74) *Attorney, Agent, or Firm* — Dicke Billig & Czaja PLLC

(57) ABSTRACT

Power allocation in printing devices is disclosed. Independent load requests are received from printing device heater systems including an independent load request is received from a printing device heater system of the printing device heater systems. A power allowance of an amount of a power output is allocated to the printing device heater system if a print substance density is outside a print substance density threshold and the independent load request is outside a load threshold.

20 Claims, 5 Drawing Sheets

---

100

RECEIVE LOAD REQUESTS FROM HEATER SYSTEMS
102

GENERATE POWER ALLOWANCE BASED ON LOAD REQUESTS INCLUDING PROVIDE AN ASSIGNED POWER OUTPUT TO A HEATER SYSTEM IF A PRINT SUBSTANCE DENSITY IS OUTSIDE A THRESHOLD AND A LOAD REQUEST OF THE HEATER SYSTEM IS OUTSIDE A THRESHOLD
104

POWER ALLOCATION IN PRINTING DEVICES

BACKGROUND

Printing devices can include printers, copiers, fax machines, multifunction devices including additional scanning, copying, and finishing functions, all-in-one devices, or other devices such as pad printers to print images on three dimensional objects and three-dimensional printers such as additive manufacturing devices. In general, printing devices apply a print substance often in a subtractive color space or black to a medium via a device component generally referred to as print engine having a print head. A medium can include various types of print media, such as plain paper, photo paper, polymeric substrates and can include any suitable object or materials to which a print substance from a printing device is applied including materials, such as powdered build materials, for forming three-dimensional articles. Print substances, such as printing agents, marking agents, and colorants, can include toner, liquid inks, or other suitable marking material that in some examples may be mixed with fusing agents, detailing agents, or other materials and can be applied to the medium.

DETAILED DESCRIPTION

Figure 1:
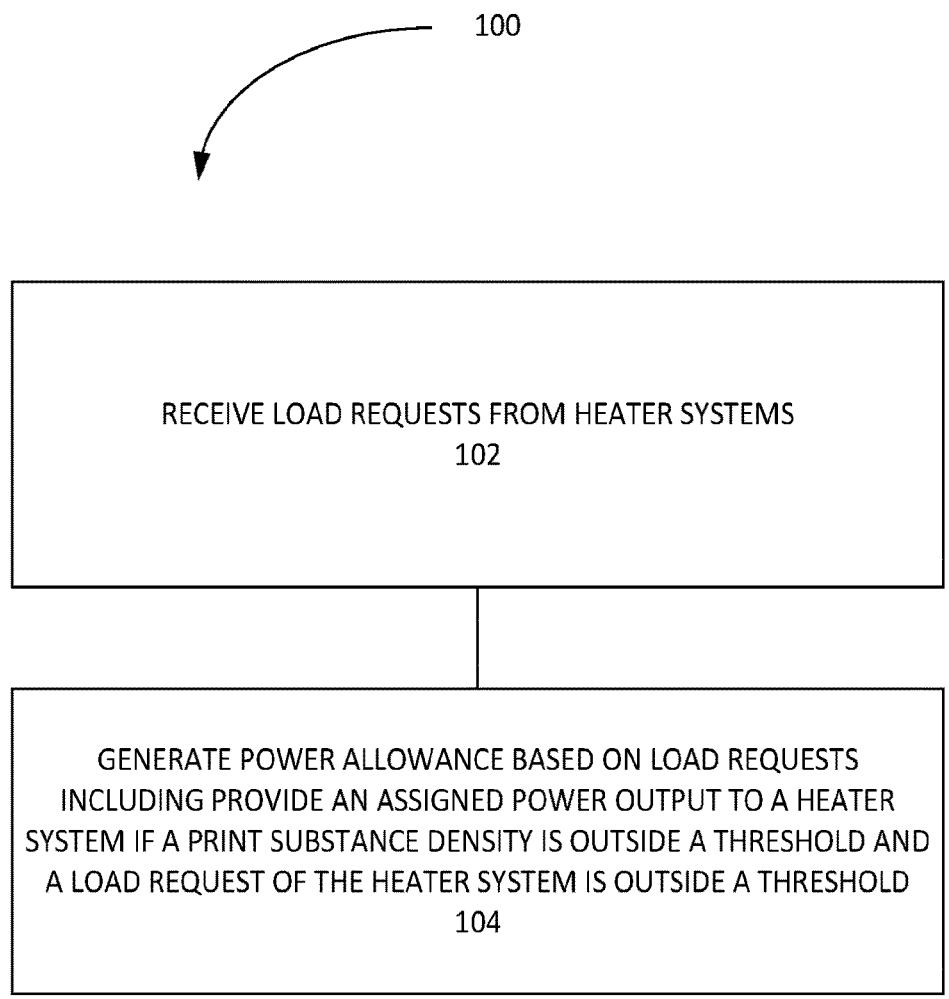
FIG. 1 is a block diagram illustrating an example method.

Printing devices may include conditioning systems, which can apply heat or pressure to a printed medium prior to output. In one example, a medium may progress through a printing device along a media path from a print engine, which can apply a print substance to the medium, to the conditioning system, which can apply heat or pressure to the printed medium, and then to an output. In some examples, the output of a printing device can be coupled to a finishing system that can include stapling systems and collation stackers. The print engine may be configured for image quality that can produce undesirable physical characteristics in the medium that may affect the final product or make difficult further processing of the output media. For instance, as a medium such as piece of paper becomes more saturated with a print substance, the paper becomes less stiff and begins to suffer from cockle, which includes wrinkling in areas of print substance, or begins to curl or bend. The undesirable physical characteristics can also lead to difficulty, unreliability, or failure of finishing devices coupled to the printing device. Accordingly, conditioning systems can be included to improve the physical characteristics and quality of the printed medium within a sufficient amount of time of output to meet user expectations.

Conditioning systems impose additional power loads on the printing device in order to create sufficient heat to improve the quality of the printed medium. Many conditioning systems include a plurality of heater systems that can be selected from different types of heater systems such as dryers, fusers, and heated pressure rollers. A selected amount of power from a printing device power source, such as an alternating current type electrical power from a printing device power supply, is allocated to the plurality of heater systems as well as to the other systems of the printing device. Printing devices can include power allocation engines as an aspect of the controller to allocate or arbitrate the available amount of power to the printing device between the conditioning system and other systems of the printing device. Further, the conditioning system may include a power allocation engine as an aspect of the controller to allocate or arbitrate the available amount of power to the conditioning system between the plurality of heater systems. Under some circumstances, the demand for power may exceed the available amount of power from the power source or the amount of power to the conditioning system in which case the power allocation engines can make compromises between the heater systems. If not properly managed, the compromises can create undesirable performance issues such as poor output quality or long job completion times that can result in poor stack quality, media transport failures, poor device reliability, and printing delays.

In one example, a printing device conditioning system includes a plurality of heater systems. Each heater system of the plurality of heater systems can include an autonomous servomechanism that operates independently of the other heater systems of the plurality of heater systems. Each heater system includes a temperature sensor and a corresponding temperature setpoint. Based on the operational error between a measured temperature and the setpoint, the heater system makes a load request for an amount of power. Each load request from the plurality of heater systems is independent of the other load requests of the plurality of heater systems. The independent load requests are provided to a power allocation engine. In general, the power allocation engine applies a power arbitration process to the plurality of independent load requests. The power allocation engine allocates the available amount of power to the conditioning system based on the power arbitration process and allocates a power grant to each of the plurality of heater systems.

The power arbitration process of a typical power allocation engine is generally simple to implement and delivers a predictable output tuned to provide a plurality of power grants to common load request profiles or scenarios. One type of power arbitration process may allocate power grants according to fixed weights assigned to the heater systems providing the load requests. Another type of power arbitration process may allocate power grants according to a fixed priority order of the heater systems providing the load requests. The process may consider such factors as the position of the heater system along the media path or a thermal time constant of the heater system. In such power arbitration processes, higher priority heater systems or heater systems assigned greater weights in the process may receive more power per amount of load request or heat more quickly than lower priority heater systems or heater systems assigned lower weights in the process. While such power arbitration processes are suited for common load request profiles or scenarios, such power arbitration processes may experience slower response or imprecise thermal control under less common contexts. In some examples, a conditioning system may be subjected to numerous different contexts that could benefit from more specific power arbitration processes that could improve job throughput times and output quality.

The disclosure describes a printing device having a conditioning system with a power allocation engine including a context power adjustment system. The context power adjustment system allows the power allocation engine to adapt to many of the less common power request profiles or to more precisely tune the conditioning system to different printing contexts, including common printing contexts. In one example, heater systems can apply servomechanism processes to request power from the power allocation engine in the form of independent load requests. The power allocation engine can include a general power arbitration system to generate a corresponding power grant in response to the load request based on an available amount of power from a power source. The power grants are provided to the context power adjustment system to adjust, such as modify, the power grant based on a contextual printing condition. The power allocation engine can provide an adjusted power grant to each of the heater systems. In one example, the contextual printing context adjusts the power grants based on how the heater systems respond to various printing conditions. In some examples, the context power adjustment system may be configured to implement a number of different contextual printing conditions and provide increased response times or enhanced print quality for each context. As new load request profiles or contextual printing conditions are discovered or implemented and addressed with the context power adjustment system, existing configurations of contextual printing conditions can remain unaffected.

FIG. 1 illustrates an example method 100 for use with a printing device. For example, the example method 100 can be implemented with a power allocation engine for a conditioning system of a printing device. The conditioning system can include a plurality of printing device heater systems. The power allocation engine can distribute a power output from a power source to the plurality of printing device heater systems.

A plurality of independent load requests from each of a plurality of printing device heater systems is received including a load request of the plurality of independent load requests is received from a printing heater system of the plurality of printing device heater systems at 102. The independent load requests can be received at the power allocation engine. Each heater system of the plurality of printing device heater systems provides a corresponding independent load request to the power allocation engine. In one example of negative feedback heater systems, each of the load requests can be based on an autonomous determination of the corresponding heater system of an amount of power appropriate for the corresponding heater system to address the operational error between a setpoint and the measured process variable such as temperature from a temperature sensor. In some examples, a sum total of the plurality of independent load requests may exceed the power output from a power source, such as an amount of power allocated to the conditioning system.

A plurality of power allowances of the power output are allocated to the plurality of printing device heater systems based on a contextual printing condition, and a power allowance of the plurality of power allowances is allocated to a printing device heater system of the plurality of printing device heater systems at 104. In one example, an amount of the power output is assigned to the printing device heater system. An amount of the power output is allocated to the printing device heater system of the plurality of printing device heater systems if a print substance density is outside a print substance density threshold and the load request of the plurality of independent load requests is outside a load threshold at 104. The sum total of the plurality of power allowances does not exceed the power output from the power source. For example, all of the power output or substantially all of the power output is assigned to the printing device heater system of the plurality of printing device heater systems if a print substance density exceeds a selected print substance density threshold and the load request of the plurality of independent load requests exceeds a selected load threshold at 104.

Power allocation engine can receive load requests and allocate power allowances in quantities that can be expressed with respect to the terms of power output from the power source. In one example, the quantities can be expressed as a percentage of power output. In another example, the quantities can be expressed as units of the power source. For instance, the load requests, power allowances, and power output can be received, allocated, assigned or provided as a pulse width modulation signal, or PWM signal. The power allocation engine can receive load requests and allocate power allowances in terms of PWM. In general, a conditioning system may receive a power output S from a power source and include n heater systems in the plurality of heater systems such as heater systems $H_1, \ldots, H_n$. A heater system of the plurality of heating systems may be represented as heater system $H_i$ in which i is an integer from 1 to n. The power allocation engine can receive a load request $L_i$ from heater system $H_i$, and load request $L_i$ corresponds with heater system $H_i$. In some examples, a power grant $P_i$ of the plurality of power grants is allocated as the power allowance in response to the load request $L_i$ of the plurality of independent load requests. The power grant $P_i$ of the plurality of power grants is based on the contextual printing condition and provided to a printing device heater system $H_i$ of the plurality of printing device heater systems. In other examples, the power allocation engine can provide a general power arbitration prior to allocating the power allowance. Based on a general power arbitration of the power output from the power source, a power grant $P_i$ of the plurality of power grants is allocated in response to the load request $L_i$ of the plurality of independent load requests, and power grant $P_i$ corresponds with load request $L_i$. The power grant $P_i$ of the plurality of power grants is adjusted based on the contextual printing condition to provide an adjusted grant $A_i$ to a printing device heater system $H_i$ of the plurality of printing device heater systems as the power allowance, and heater system $H_i$ corresponds with adjusted grant $A_i$, which corresponds with power grant $P_i$.

In the example method 100, the power allocation engine considers a print substance density. Print substance density can include an amount of print substance to be applied to a unit of media for a given printing project or printed medium. All of the power output or substantially all of the power output S is allocated to the printing device heater system $H_i$ of the plurality of printing device heater systems if the print substance density exceeds a selected print substance density threshold and the load request $L_i$ of the plurality of independent load requests is outside a selected load threshold at 104. In one example, heater system $H_1$ is assigned and provided with a power allowance of S while the remaining heater system $H_2$ or remaining systems $H_2, \ldots, H_n$ of the plurality of heater systems receive a power allowance of no power. In another example, heater system $H_1$ is assigned and provided with a power allowance of jS, in which j is equal to or greater than 0 and equal to or less than 1, amount of power output while the remaining heater system $H_2$ or remaining systems $H_2, \ldots, H_n$ of the plurality of heater systems receive a power allowance of $(S-jS)/(n-1)$ amount of power output. In one example, the amount of power output assigned to the heater system is predetermined and stored in a memory.

The contextual printing condition can be based on various conditioning characteristics or characteristics of the printing device that may affect printing under general power arbitration. In one example, method 100 can be applied to a contextual printing condition in which a relatively large amount of print substance is applied to a medium and the printing device has been idle such that the heater systems are at or near ambient temperature or include a substantial operational error between the setpoint and the process variable. In such a contextual printing condition, method 100 may allocate a greater share of the power output, such as all or substantially all of the power output, to a heater system with a relatively high thermal time constant, such as an evaporative dryer system, rather than allocate power to heater systems with relatively low thermal time constants such as heated pressure roller systems. In this contextual printing condition, the dryer system will receive the power until sufficiently heated before the power is provided to the heated pressure roller systems or other heater systems with relatively low thermal time constants. The load request threshold can be selected to permit relatively fast heating of the plurality of heater systems as compared to a general power arbitration.

The example method 100 can be implemented to include hardware devices, programs, or hardware device and programs for controlling a system having a processor and memory, that can distribute a power output from a power source to a plurality of printing device heater systems. For example, method 100 can be implemented as a set of executable instructions stored in a computer memory device for controlling the processor.

Figure 2:
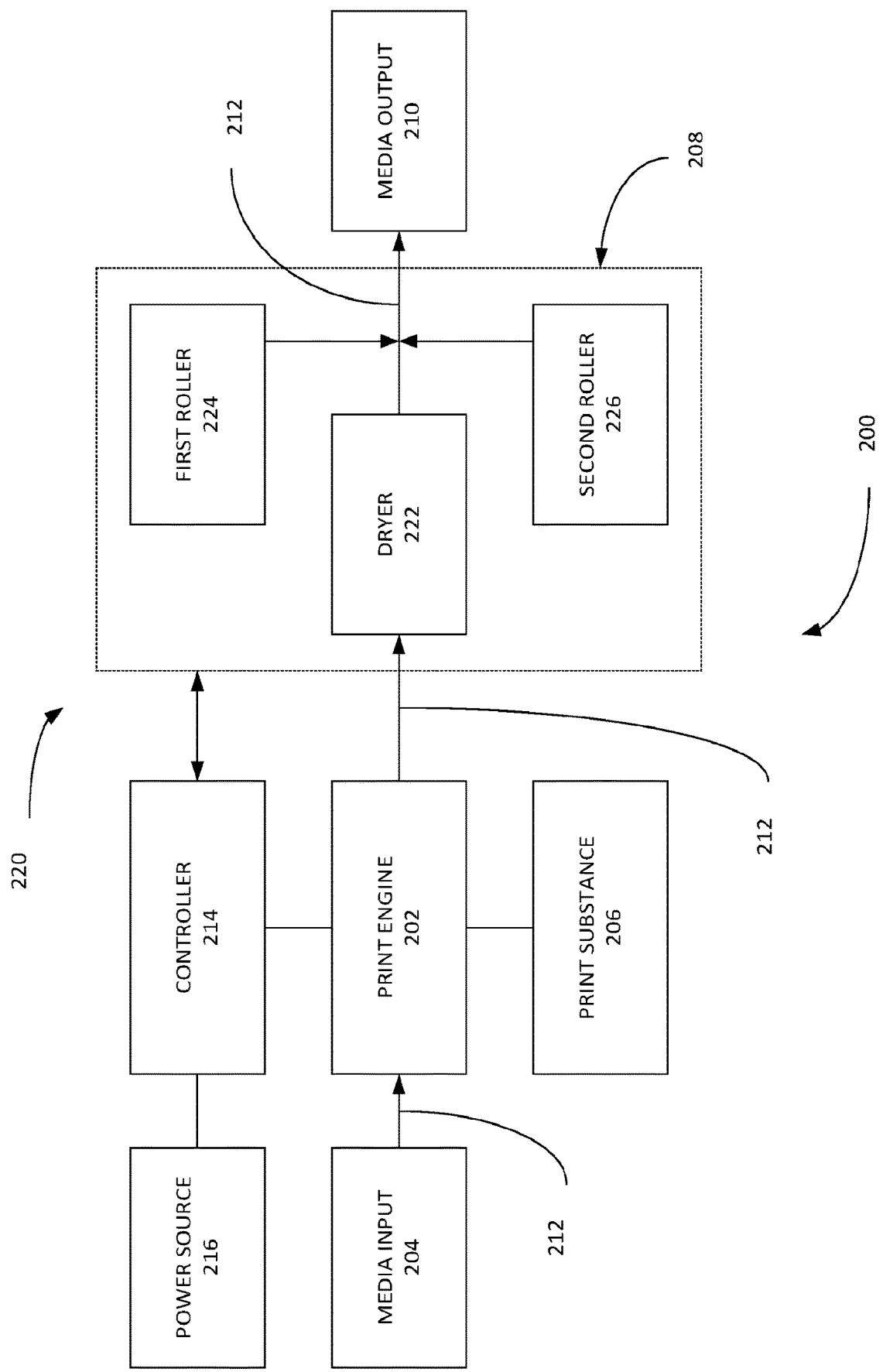
FIG. 2 is a block diagram illustrating an example printing device to implement the example method of FIG. 1.

FIG. 2 illustrates an example printing device 200 that can receive source images or models, implement example method 100 with a conditioning system 220, and produce printed images or articles on or with media via a print process. Printing device 200 includes a print engine 202 that includes mechanisms and logic to print or mark images on media or form articles from media. A media input 204 can provide a selected medium to the print engine 202 on which the images can be printed or marked. The print engine 202 is coupled to a consumable print substance 206, which can be used to print or mark the medium. For example, the printing device 200 can implement a subtractive color space and the print substance 206 includes each of a cyan, magenta, yellow, and black print substance or the printing device 200 can implement a greyscale color space and the print substance includes a black print substance. Examples of print engines 202 can include ink jet print engines that apply a fluid, such as a liquid print substance 206 including water-based print substances, and laser print engines that apply particles of a toner as the print substance 206. In one example, the print engine 202 delivers the print substance 206 to the medium via a print head selectively positioned proximate the medium. Printed media from the print engine 202 can be provided to a plurality of heater systems 208, which can apply heat to the printed media, and subsequently to a media output 210. In one example, the media output 210 can include or be coupled to a finishing module that can cut, collate, stack, staple, or otherwise provide the printed media in a selected finished form. In one example, the medium is provided along a media path 212 in the printing device 200 from the media input 204 to the media output 210. For example the media path 212 can be arranged to extend from the media input 204, to the print engine 202, through the plurality of heater systems 208, which may be selectively arranged along the media path 212, to the media output 210.

A controller 214, which can include a combination of hardware and programming, such as firmware stored on a memory device executed with a processing device, is operably coupled to the print engine 202 and the plurality of heater systems 208 to perform methods that affect the print process and route the medium along the media path 212. The controller 214 can be implemented in a variety of hardware configurations including a single processing node, a processing device having multiple processing nodes such as processing cores, and a set of interconnected processing devices having distributed processing nodes throughout the printing device 200. The controller 214 can receive a signal representative of a digital image or model to be translated into a form suitable for the print engine 202 to apply the print substance 206 via the print head to a selected medium. In another example, the controller 214 is operably coupled to process sensors or process inputs to receive a signal representative of a process characteristic. Examples of process sensors can include ambient temperature sensors, humidity sensors, and atmospheric pressure sensors, and examples of process characteristic inputs can include speed of the printing process, the presence of finishing or conditioning equipment, simplex or duplex printing, and amount of sheets of media to be stapled. Also, the controller 214 can be operably coupled to the plurality of heater systems 208 to selectively operate and control the heater systems 208 as part of the print process. Still further, the printing device 200 can include a power source 216, such as a power supply, to provide power to components of the printing device 200 such as the print engine 202, the plurality of heater systems 208, and the controller 214, and the controller 214 can be used to selectively distribute power from the power source 216 based on a power allocation scheme such as method 100.

The plurality of heater systems 208 can include dryers, blowers, fusers, heated pressure rollers, lamps, and other types of heating devices or elements that may be used to dry the print substance on the medium or otherwise condition the printed medium. The heater systems 208 can be arranged along the media path 212 to sequentially condition the printed medium, concurrently condition the printed medium such as two or more of the plurality of heater system 208 applied to the printed medium at the same time or at the same point in the media path 212, or a combination of sequentially and concurrently arranged heater systems 208 along the media path 212. In the example printing device 200, the heater systems 208 include a dryer system 222, a first heated pressure roller system 224, and a second heated pressure roller system 226 for illustration. In the example, the dryer system 222 conditions the printed media along the media path 212 prior to the first and second heated pressure roller systems 224, 226. Also in the example, the first and second heated pressure roller systems 224, 226 concurrently condition the printed medium along the media path 212. The first heated pressure roller system 224 can include an inner heated pressure roller that may be configured to condition an inner section of a width of the media path 212, and the second heated pressure roller system 226 can include an outer heated pressure roller that may be configured to condition an outer section, or outer sections of the width of the media path 212. The first heated pressure roller system 224 can include a heating element such as a halogen lamp to heat the inner roller. The second heated pressure roller system 226 can also include a heating element such as a halogen lamp to heat the outer roller.

Heater systems 208 can be characterized by a thermal time constant that may be affected by factors such as thermal mass or the amount of power used to generate a selected temperature increase. For example, a heater system with a relatively high thermal time constant may include a relatively higher thermal mass, a relatively lower power applied to it to generate a selected temperature increase, or both compared to a heater system with a relatively low thermal time constant. In the example printing device 200, the dryer system 222 includes a relatively higher thermal time constant than the time constants of the first and second heated roller systems 224, 226. The dryer system 222 can command a higher load request and an additional time to heat to a selected temperature than, for example, the first and second heated pressure roller systems 224, 226.

In one example, each heater system of the plurality of heater systems 208 can include mechanisms that can operate autonomously and independently of the other heater systems of the plurality of heater systems 208. In one example, each heater system 208 can include a heating element, a temperature sensor, and a servomechanism or regulator that can operate via negative feedback. For example, the temperature sensor can detect a temperature of the heating element, and the servomechanism can compare the temperature to a selected setpoint or target temperature provided via the controller 214 to estimate an operational error. A servo process of the servomechanism can receive the operational error and determine a request for an amount of power from the controller 214 that can selectively heat the heating element in such a manner as to reduce the operational error. The heater system 208 can provide the requested amount of power as a load request to the controller 214. The controller 214 can grant an amount of power based on the load request applied to a general power arbitration process as a power grant, and adjust the power grant to be an adjusted grant provided to the heater system 208. In one example, pulse width modulation, or PWM, can be used to deliver power to the heating element, and the heater system 208 can provide the load request to the controller 214 and receive the adjusted grant from the controller 214 in terms of PWM. Additionally, the power output from the power source 216 can be provided to heater systems 208 and allocated in terms of PWM. While PWM is provided as an illustration in this disclosure, other power request and delivery techniques, including other signal modulation techniques, can be applied.

Figure 3:
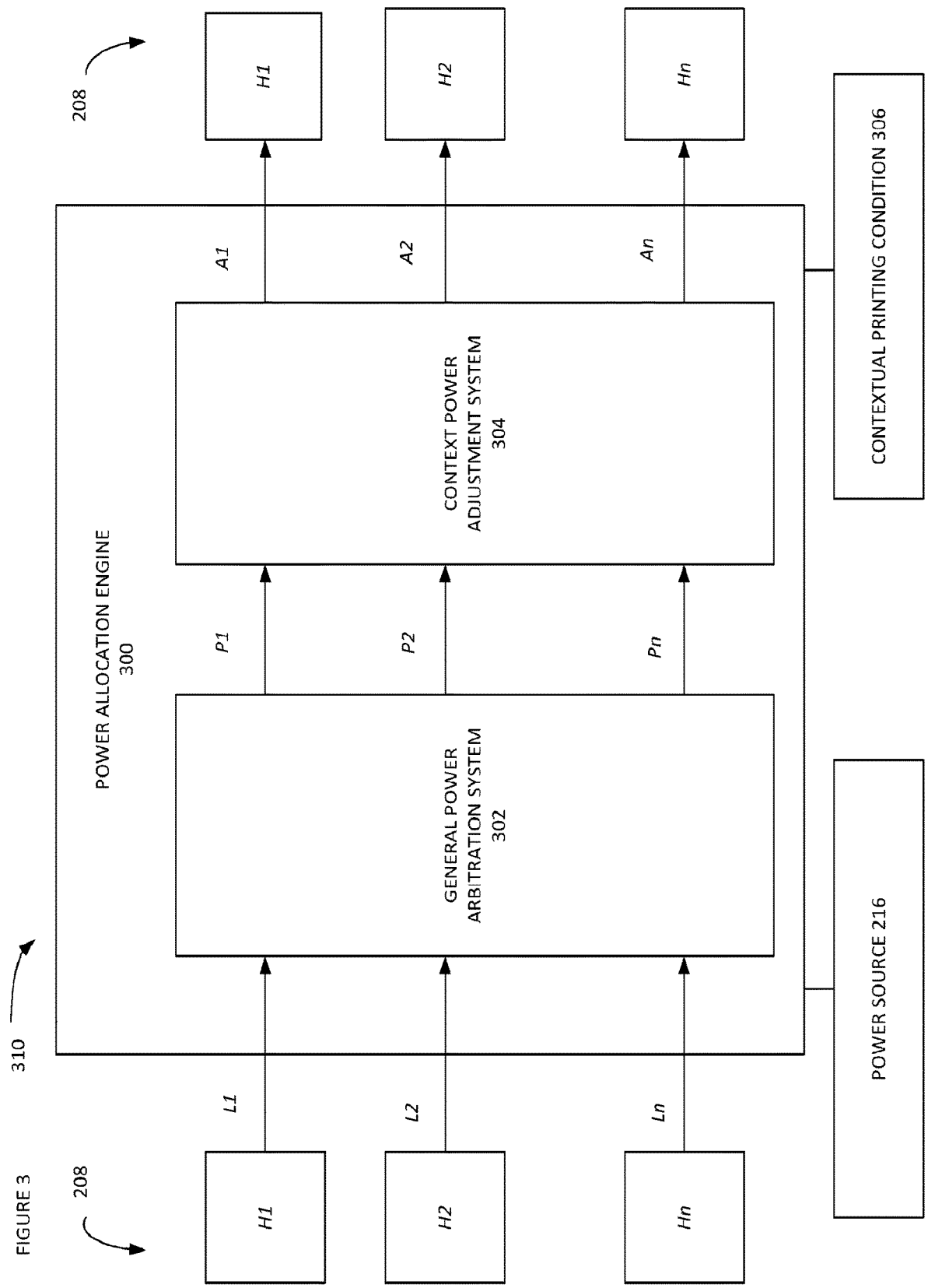
FIG. 3 is a block diagram illustrating an example system to implement the example method of FIG. 1, which can be included in the example printing device of FIG. 2.

FIG. 3 illustrates an example power allocation engine 300, which can be included as an aspect of the controller 214, to implement the method 100 and distribute power from the power source 216 to the heater systems 208. The power allocation engine 300 and heater systems 208 can be included as part of a conditioning system 310 of the printing device 200. The example power allocation engine 300 includes a general power arbitration system 302 operably coupled to a contextual power adjustment system 304. A plurality of independent load requests $L_1, L_2, \ldots, L_n$, from each of a plurality of printing device heater systems $H_1, H_2, \ldots, H_n$, 208 are received at the power allocation engine 300, such as at the general power arbitration system 302 in one example. The power source 216 can provide a power output S to the power allocation engine 300. The general power arbitration system 302 can provide a general power arbitration process of the power output S to the plurality of independent load requests $L_1, L_2, \ldots, L_n$, and allocate a plurality of corresponding power grants $P_1, P_2, \ldots, P_n$ in response to the plurality of independent load requests $L_1, L_2, \ldots, L_n$. The plurality of power grants $P_1, P_2, \ldots, P_n$ are provided to the context power adjustment system 304. In one example, the context power adjustment system 304 adjusts the plurality of power grants $P_1, P_2, \ldots, P_n$ based on a contextual printing condition 306 to provide a plurality of adjusted grants $A_1, A_2, \ldots, A_n$ to the plurality of printing device heater systems $H_1, H_2, \ldots, H_n$ 208. The power allocation engine 300 can periodically sample the plurality of independent load requests $L_1, L_2, \ldots, L_n$, to allocate a plurality of corresponding power grants $P_1, P_2, \ldots, P_n$, and provide the plurality of adjusted grants $A_1, A_2, \ldots, A_n$ to the plurality of printing device heater systems $H_1, H_2, \ldots, H_n$ 208. In one example, power allocation engine 300 can periodically sample the plurality of independent load requests $L_1, L_2, \ldots, L_n$, and provide the plurality of adjusted grants $A_1, A_2, \ldots, A_n$ to the plurality of printing device heater systems $H_1, H_2, \ldots, H_n$ 208 every few seconds, such as every three seconds.

The general power arbitration system 302 provides a general power arbitration of the power output S from the power source 216. In one example, the general power arbitration system 302 ensures that a sum total of the plurality of power grants $P_1, P_2, \ldots, P_n$ does not exceed the power output S from the power source 216. The general power arbitration system 302 can determine a normalizing factor N from the plurality of load requests $L_1, L_2, \ldots, L_n$. In order to generate the normalizing factor N, the plurality of load requests $L_1, L_2, \ldots, L_n$ are added together and the resulting sum $L_{TOT}$ is divided by the power output S to determine a quotient Q, i.e., $Q=L_{TOT}/S$. The normalizing factor N is the larger of the quotient Q or 1, i.e., N=max(Q, 1), in which max(Q, 1) returns the larger value of Q and 1. In one simple example of a general power arbitration system 302, each load request $L_i$ is divided by the normalizing factor N to obtain a corresponding power grant $P_i$, i.e. $P_i=L_i/N$.

The general power arbitration system 302 may allocate the plurality of the power grants $P_1, P_2, \ldots, P_n$ according to fixed weights $w_1, w_2, \ldots, w_n$ assigned to the heater systems $H_1, H_2, \ldots, H_n$ 208 based on the received plurality of independent load requests $L_1, L_2, \ldots, L_n$. For example, the general power arbitration system 302 may determine each power grant $P_i$ from the corresponding load request $L_i$ according to $P_i=(w_i L_i)/N$. In one example of a determining a normalizing factor N using fixed weights to allocate power arbitration, a weighted normalizing factor $N_w$ can be calculated so that the sum of the power grants $(P_1+ \ldots +P_n)$ does not exceed the power output S. In this example, a weight quotient $Q_w$ is determined as $Q_w=(w_1 L_1+ \ldots +w_n L_n)/S$, and the weighted normalizing factor $N_w$ is provided from $N_w=\max(Q_w, 1)$. Each power grant $P_i$ can be determined via $P_i=(w_i L_i)/N_w$.

In this example, the weights $w_1, w_2, \ldots, w_n$ may be assigned to the plurality of heater systems $H_1, H_2, \ldots, H_n$ 208 in such a manner as to give a load request from a heater system of the plurality of heater systems preference over a load request from another heater system of the plurality of heater systems $H_1, H_2, \ldots, H_n$ 208, such as if a weight $w_i$ was larger than another weight. A relatively larger weight $w_i$ would give relatively more priority to the corresponding load request $L_i$, and a relatively smaller weight $w_i$ would give relatively less priority to the corresponding load request $L_i$. Also, the weights $w_1, w_2, \ldots, w_n$ may be assigned to plurality of heater systems in such a manner as to not give preference to the load request of a heater system over the load request of another heater system, such as if the weights $w_1, w_2, \ldots, w_n$ were equal to each other, including all of the weights set to 1. In some example, the weights can be stored as data in a non-transitory storage medium, selectively modified on occasion, and applied to the general power arbitration system 302 to determine the power grants $P_1, P_2, \ldots, P_n$.

In another example, the general power arbitration system 302 may allocate the plurality of the power grants $P_1, P_2, \ldots, P_n$ according to a fixed priority order assigned to the heater systems $H_1, H_2, \ldots, H_n$ 208 based on the received plurality of independent load requests $L_1, L_2, \ldots, L_n$. In this example, the general power arbitration system 302 provides a power grant $P_i$ to a load request $L_i$ from a heater system $H_i$ having a higher assigned priority before it will provide a power grant to a load request from a heater system having a lower assigned priority. In one example, the heater system having the highest priority will receive a power grant based on a corresponding load request. If any power output from the power source 216 remains to be allocated, the heater system having the next highest priority will receive a power grant based on a corresponding load request, and so on, until all heater systems have received a power grant or the power output S has been completely allocated.

In one example, the general power arbitration system 302 applies priority, whether by assigning weights $w_1, w_2, \ldots, w_n$ or by assigning a priority order, via thermal time constant of the corresponding heater system 208. For example, the heater system having the largest thermal time constant is ascribed the highest priority, the heater system with the next largest thermal time constant is ascribed the next highest priority, and so on until the heater system with the smallest thermal time constant is ascribed the lowest priority. In the example of the heater systems 208, the evaporative dryer 222 generally includes a larger, or longer, thermal time constant than the first and second heated pressure roller systems 224, 226, and thus can be ascribed a higher priority in the general power arbitration system 302.

If the power allocation engine 300 does not receive a contextual printing condition 306, the power allocation engine can simply provide the power grants $P_1, P_2, \ldots, P_n$ to the corresponding heater systems $H_1, H_2, \ldots, H_n$ 208. The context power adjustment system 304 can be bypassed or not invoked. The power output S is allocated to the heater systems heater systems $H_1, H_2, \ldots, H_n$ 208 according to the power grants $P_1, P_2, \ldots, P_n$. If, however, the power allocation engine 300 receives a contextual printing condition 306, the context power adjustment system 304 is invoked.

The context power adjustment system 304 adjusts each power grant $P_i$ from general power arbitration system 302 based on the contextual printing condition 306 received at the power allocation engine 300. The contextual printing condition 306 can be based on various conditioning characteristics or characteristics of the printing device 200 that may affect printing under general power arbitration system 302. For example, the contextual printing condition 306 can include data related to the medium to be printed such as the type of medium and the orientation of the medium during printing, data related to the print substance 206 such as the type and the amount of print substance to be applied to the medium, data related to ambient settings, and data related to the printing device 200 such as whether the printing device 200 is in sleep mode or at startup, whether a heater system 208 is working inefficiently based on system diagnostics, and other characteristics. The context power adjustment system 304 receives the contextual printing condition 306 and applies a set of rules that can be included in a plurality of sets of rules, to adjust the power grants $P_i$ from the general power arbitration system 302 to address the contextual printing condition 306. According to the contextual printing condition 306, the power grant $P_i$ is adjusted with the context adjustment system 304 to generate an adjusted grant $A_i$, and the adjusted grant $A_i$ is provided to the corresponding heater system $H_i$.

In one example, the contextual printing condition 306 can be based on print substance density and, in some examples, also on a load request. Print substance density can correspond with an amount of print substance 206 to be applied to a unit of media, such as a sheet of paper or a page, for a given printing project or printed medium. In some examples, duplex, or double sided printing, can be considered in determining print substance density. A given medium with relatively large amount of print substance generally includes a higher print substance density than the given medium with a relatively less amount of print substance. In some examples, the type of print substance or print substance formulation can also affect print substance density, such as print substance that include a larger percentage of water per unit of print substance may provide a larger print substance density per unit of print substance applied to the medium than print substances with a smaller percentage of water per unit of print substance applied to the medium. In one example, a printed medium is first conditioned with the evaporative dryer 222 along the media path 212. Media jams, such as paper jams, may occur along the media path 212 prior to the first and second heated pressure roller systems 224, 226 if the printed medium is poorly conditioned with the dryer 222. Print substance density can affect the conditioning of the printed medium. In general, a given medium with a larger print substance density is more difficult to condition with the dryer system than the medium with a smaller print substance density. For example, in order to avoid such jams or other deleterious effects, the printed medium is not conditioned with the dryer system 222 until the dryer system 222 has reached a suitable temperature for media with relatively high print substance density. A contextual printing condition 306 can include a relatively high print substance density that may be accompanied with a relatively large load request from the dryer 222, such as if the printing device 200 has been idle or the temperature of the dryer system 222 is low. Conversely, a contextual printing condition 306 can include a relatively low print substance density that may be accompanied with a relatively small load request from the dryer system 222 such as if the dryer system 222 is already warm.

Figure 4:
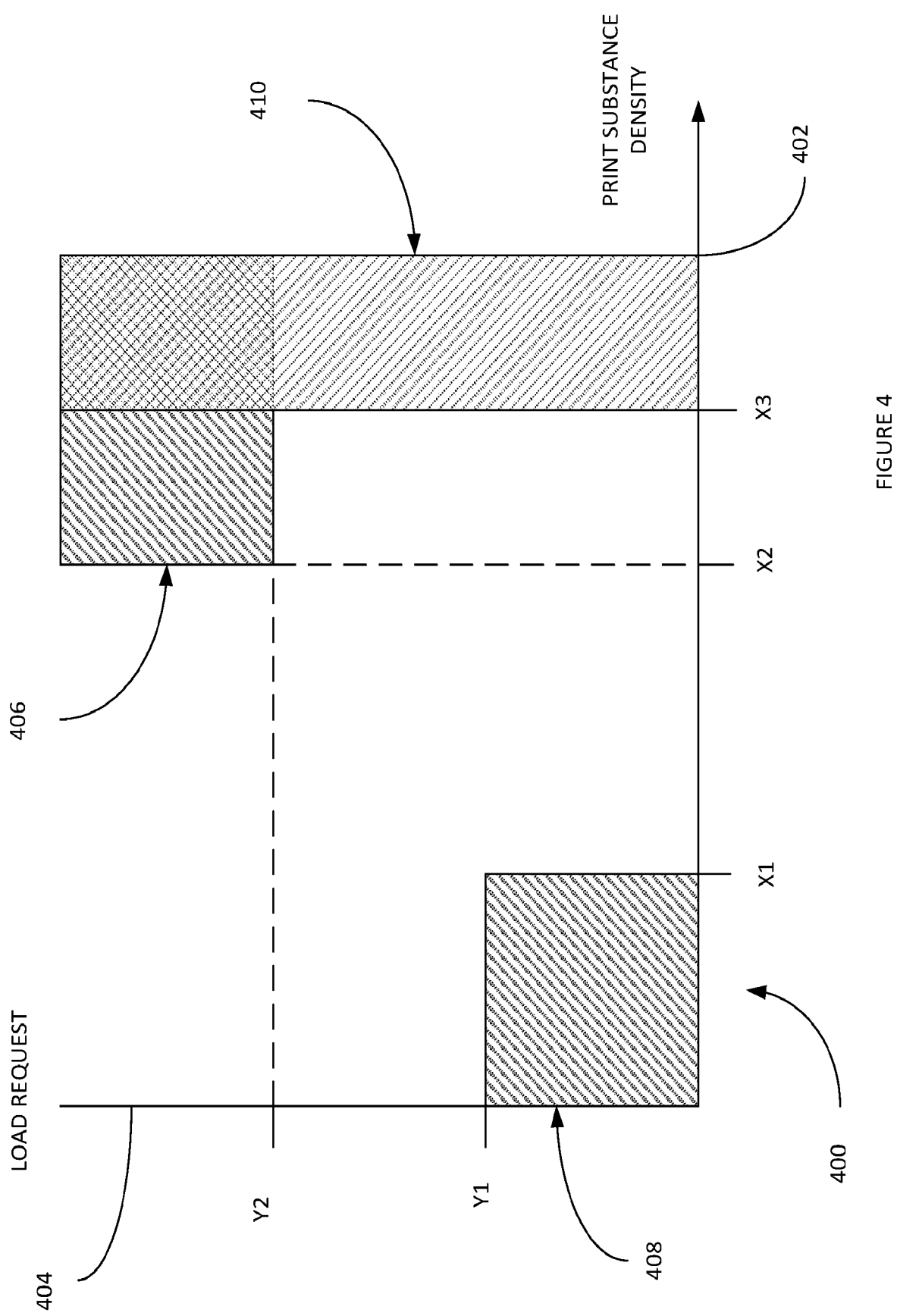
FIG. 4 is a chart illustrating a plurality of contextual printing conditions applicable to the example system of FIG. 3.

FIG. 4 illustrates a graph 400 of a plurality of contextual printing conditions that can occur based on print substance density and, in some examples, also on a load request. Based on factors such as the amount of print substance on a given medium, as well as factors that may include the type of print substance applied to the medium such as the amount of moisture in the print substance, and the type of medium, the page to be printed, or the print job, can be provided with a print substance density score D. The graph 400 includes a horizontal axis 402 having values of the print density from a zero print substance density to a maximum print substance density (such as print substance density of a medium completely saturated with print substance). The graph 400 also includes a vertical axis 404 having values of a load request $L_i$ from a zero load request to a maximum load request (such as a load request that is equal to the power output S). In one example, the load request $L_i$ of the vertical axis 404 can correspond with the heater system $H_i$ having the largest thermal time constant, such as the dryer systems 222 of the heater systems 208, which may also be positioned first along the media path 212 to condition the medium prior to the first and second heated pressure roller systems 224, 226.

Graph 400 illustrates circumstances for three contextual printing conditions. A first contextual printing condition 406 can be invoked in a circumstance having a relatively high load request $L_i$ and a relatively high print substance density score D. In this example, the load request $L_1$ is greater than a selected load request value Y2 and the print substance density score D is greater than a selected print substance density value X2. Another contextual printing condition 408 can be invoked in a circumstance having a relatively low load request $L_i$ and a relatively low print substance density score D. In this example, the load request $L_i$ is less than a selected load request value Y1 and the print substance density score D is less than a selected print substance density value X1. A third contextual printing condition 410 can be invoked in a circumstance having a relatively very high print substance density score D regardless of the load request $L_i$. In this example, the print substance density score D is greater than a selected print substance density value X3. Other contextual printing conditions on graph 400 are contemplated. In some examples, contextual printing conditions on graph 400, including contextual printing conditions 406, 408, 410, may overlap. For example, illustrated first and second contextual printing conditions 408 and 410 overlap in cases in which the load request $L_i$ is greater than value Y2 and the print substance density score D is greater than value X3. In one example, print substance density values X3>X2>X1, and load request values Y2>Y1.

In one example, the context power adjustment system 304 is configured to implement method 100. For example, the context power adjustment system 304 can provide adjusted grants $A_i$ to the plurality of printing device heater systems 208 if the first contextual printing condition 406 is invoked. In this example, all or substantially all of the power output S is allocated to the printing device heater system $H_i$ of the plurality of printing device heater systems having the largest thermal time constant, such as the dryer system 222, if the print substance density score D is meets or exceeds a selected print substance density threshold, such as the print substance density score D meets or exceeds print substance density value X2, and the load request $L_i$ of the plurality of independent load requests meets or exceeds a selected load threshold, such as the load request equals or exceeds load request value Y2.

In the example of the printing device 200, the context power adjustment system 304 can provide adjusted grants according to:

If the print substance density score D is equal to or greater than print substance density value X2 and the load request $L_1$ is equal to or greater than load request value Y2, then $A_1=S$, in which $H_1$ is the dryer system 222;

$A_2=0$, in which $H_2$ is the first heated pressure roller system 224;

$A_3=0$, in which $H_3$ is the second heated pressure roller system 226.

The adjusted grants from method 100 can provide for a relatively quick time to prepare the conditioning system 310 including the heater systems 208 of the printing device 200 to receive a printed medium. The method 100 is invoked in contextual printing condition 406 to provide faster preparation of the conditioning system 310 than with the general power arbitration system 302 alone. In some examples, the contextual printing condition 406 can cause the power allocation engine 300 to bypass the general power arbitration system 302 because, in such examples, the power grants $P_1, P_2, \ldots, P_n$, are not relevant in determining the adjusted grants or to the allocation of the power output S. The contextual printing condition 406 can be invoked in an example circumstance such as in printing documents with heavy text or heavy graphics in which the dryer system 222 is at ambient temperature such as when the printing device 200 has been idle for a relatively long period of time, such as enough time to cause the printing device 200 to enter a sleep mode. The values of X2 and Y2 can be determined by characterization. Further, the values of X2 and Y2 may be adjusted based on ambient settings such as ambient temperature or humidity.

In another example of the printing device 200, the context power adjustment system 304 can provide an amount of power output assigned to a printing device heater system base on other contextual printing conditions. For example, the context power adjustment system 304 can provide adjusted grants according to:

If the print substance density score D is equal to or less than print substance density value X1 and the load request $L_1$ is equal to or less than load request value Y1, then $A_1=0$, in which $H_1$ is the dryer system 222;

$A_2=S/2$, in which $H_2$ is the first heated pressure roller system 224;

$A_3=S/2$, in which $H_3$ is the second heated pressure roller system 226.

In these examples, the power allowances are allocated or assigned power amounts rather than adjusted power grants from on a general power allocation. In one example, the amount of power output assigned to the heater system is predetermined and stored as data in a non-transitory storage medium, and can be selectively modified on occasion.

Figure 5:
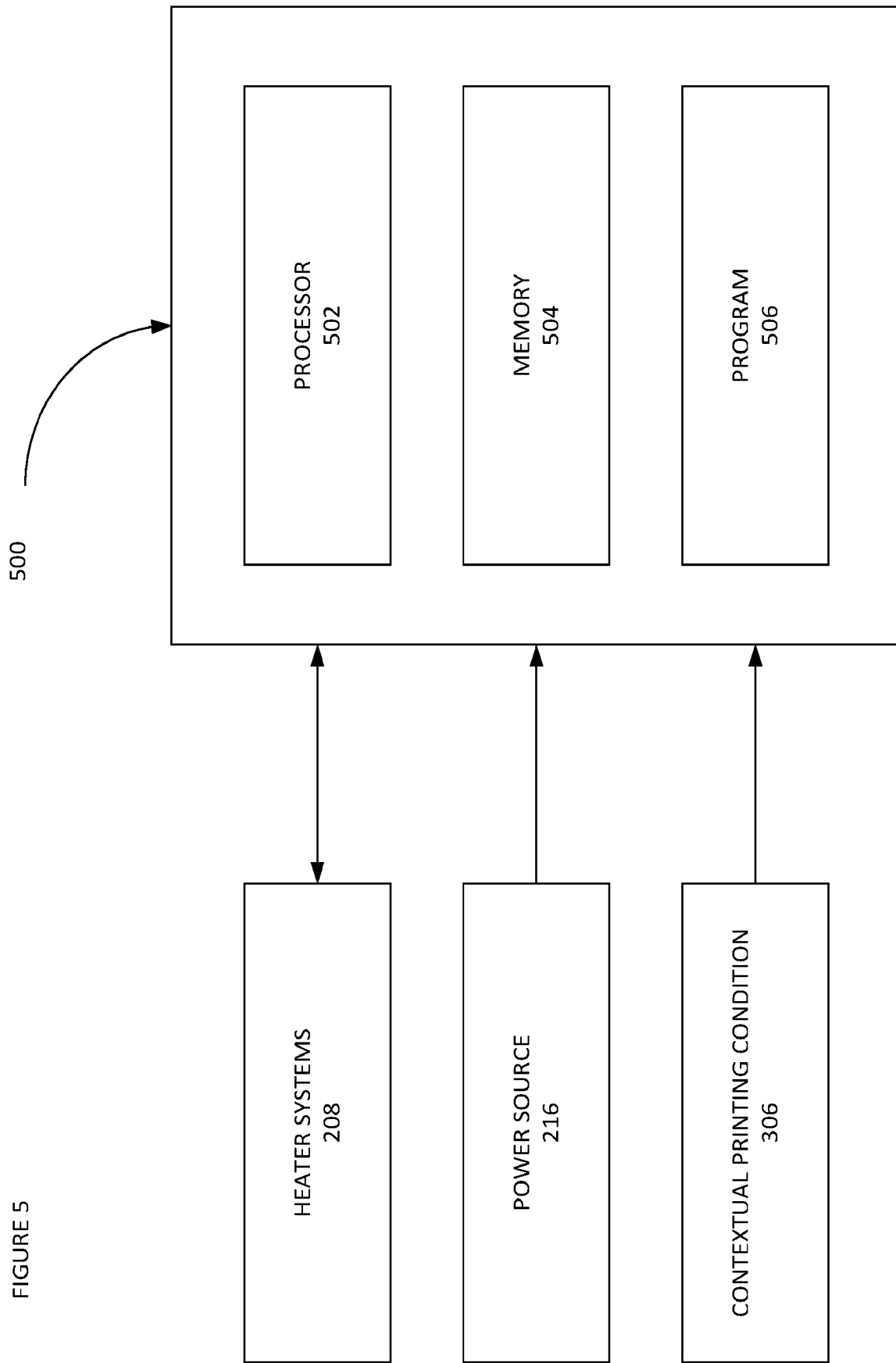
FIG. 5 is a block diagram illustrating an example system to implement the example method of FIG. 1, which can be included in the example printing device of FIG. 2.

FIG. 5 illustrates an example system 500 including a processor 502 and memory 504 and program 506 to implement example method 100. In one example, system 500 can be implemented with the controller 214 of the printing device 200 as the power allocation engine 300. Program 506 can be implemented as a set of processor-executable instructions stored on a non-transitory computer readable medium such as memory 504 to control processor 502. Computer readable media, computer storage media, or memory may be implemented to include a volatile computer storage media, nonvolatile computer storage media, or as any suitable method or technology for storage of information such as computer readable or executable instructions, data structures, program modules or other data. A propagating signal by itself does not qualify as storage media or a memory device.

System 500 is configured to receive a plurality of load requests $L_1, L_2, \ldots, L_n$ as signal data from heater systems 208. In one example, each of the load requests is received as a PWM signal that may be converted to digital data for use with program 506. System 500 may also receive a contextual printing condition 306 as a set of data stored in on a computer storage medium or provided via signals received from components of a printing device 200 and a power output S from a power source 216 to be allocated to the heater systems 208. System 500 applies contextual printing condition 306 to generate power grants $P_1, P_2, \ldots, P_n$ or adjusted grants $A_1, A_2, \ldots, A_n$ corresponding with the load requests provided to the heater systems 208 via signals such as PWM signals.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
receiving, by a controller, independent load requests from a plurality of printing device heater systems including receiving an independent load request of the independent load requests from a printing device heater system of the plurality of printing device heater systems; and
allocating, by the controller, a plurality of power allowances of a power output based on a contextual printing condition and the independent load requests received by the controller from the plurality of printing device heater systems including assigning a power allowance of the plurality of power allowances as an amount of the power output to the printing device heater system of the plurality of printing device heater systems is in response to a print substance density being outside a print substance density threshold and the independent load request of the independent load requests being outside a load threshold.

2. The method of claim 1, wherein the printing device heater system of the plurality of printing device heater systems is a dryer system, and each of the independent load requests are for a requested amount of power.

3. The method of claim 1, wherein the amount of the power output includes all of the power output available from a power source that is allocated to the printing device heater system and the remaining plurality of printing device heater systems are allocated no power output.

4. The method of claim 1, wherein the receiving the plurality of independent load requests include receiving a pulse width modulation signal from each of the printing device heater systems.

5. The method of claim 1, wherein the power allowance of the plurality of power allowances is provided to the printing device heater system of the plurality of printing device heater systems as a pulse width modulation signal.

6. The method of claim 1, wherein the plurality of printing device heater systems includes a dryer system and heated pressure roller systems.

7. The method of claim 1, including allocating a plurality of power grants based on a general power arbitration of a power source in response to the plurality of independent load requests in response to the independent load request of the plurality of independent load requests being within the load threshold.

8. The method of claim 1, wherein assigning the power allowance of the plurality of power allowances as a predetermined amount of power output.

9. The method of claim 1, wherein allocating the plurality of power allowances includes assigning the power allowance of the plurality of power allowances as an amount of the power output to each of the plurality of printing device heater systems based on an available amount of power from a power source and the contextual printing condition that includes the print substance density.

10. The method of claim 1, wherein allocating the plurality of power allowances includes assigning the power allowance of the plurality of power allowances as an amount of the power output to the plurality of printing device heater systems based on an available amount of power from a power source, the contextual printing condition, and a set of rules to address to contextual printing condition.

11. A printing device, comprising:
a conditioning system having a plurality of heater systems, the conditioning system including a heater system of the plurality of heater systems;
a power source operably coupled to the conditioning system, the power source providing a power output to the plurality of heater systems; and
a controller operably coupled to the plurality of heater systems and the power source to distribute the power output between the plurality of heater systems, the controller to;
receive independent load requests from each of the plurality heater systems including receive an independent load request of the independent load requests from the heater system of the plurality of heater systems; and
allocate a plurality of power allowances of a power output based on a contextual printing condition and the independent load requests received by the controller from the plurality of printing device heater systems including assign a power allowance of the plurality of power allowances as an amount of the power output to the heater system of the plurality of heater systems in response to a print substance density being outside a print substance density threshold and the independent load request of the independent load requests is outside a load threshold.

12. The printing device of claim 11, wherein the heater system of the plurality of heater systems is a dryer system.

13. The printing device of claim 11, wherein each of the plurality of heater systems provides the independent load requests as a pulse width modulation load request signal and the controller provides the power allowance of the plurality of power allowances to the heater system of the plurality of heater systems as a pulse width modulation power allowance signal.

14. The printing device of claim 11, wherein each of the plurality of heater systems include a temperature sensor and a corresponding temperature setpoint, and the plurality of heater systems are to provide the independent load requests to the controller based on an operational error between a measured temperature from the temperature sensor and the corresponding temperature setpoint.

15. The printing device of claim 11, wherein the print substance density threshold is based on factors selected from a group consisting of:
an amount of print substance, a type of print substance applied to a medium, an amount of moisture in the print substance, and a type of medium, a page to be printed, and a print job.

16. A non-transitory computer readable medium to store computer executable instructions to control a processor to:
receive independent load requests from each of a plurality of printing device heater systems including receive an independent load request of the plurality of independent load requests from a heater system of the plurality of printing device heater systems; and
allocate a plurality of power allowances of a power output based on the independent load requests received from the plurality of printing device heater systems including assign a power allowance of the plurality of power allowances as an amount of the power output to the heater system of the plurality of heater systems in response to a print substance density being outside a print substance density threshold and the independent load request of the independent load requests being outside a load threshold.

17. The non-transitory computer readable medium of claim 16, including executable instructions to allocate a plurality of power grants based on a general power arbitration of a power source in response to the plurality of independent load requests if the load request of the plurality of independent load requests is within the load threshold.

18. The non-transitory computer readable medium of claim 17, wherein the amount of the power output includes all of an available amount of power output from a power source.

19. The non-transitory computer readable medium of claim 17, wherein the executable instructions to allocate the power allowance includes executable instructions to provide a pulse width modulation signal to the printing device heater system of the plurality of printing device heater systems.

20. The non-transitory computer readable medium of claim 16, wherein the non-transitory computer readable medium forms part of a controller of a printing device that includes the plurality of printing device heater systems, wherein the executable instructions to allocate the power allowance includes executable instructions to allocate the plurality of allowances to the plurality of printing device heater systems based on a contextual printing condition and the independent load requests received by the controller from the plurality of printing device heater systems.

* * * * *